United States Patent Office 3,046,266
Patented July 24, 1962

3,046,266
POLYMERIZATION OF ETHYLENE WITH A CATALYST OF TiCl₃ GROUND IN PROPYLENE
Calvin J. Benning, Clarksville, and Walter R. Wszolek, Ellicott City, Md., assignors to W. R. Grace & Co., New York, N.Y., a corporation of Connecticut
No Drawing. Filed May 25, 1960, Ser. No. 31,523
6 Claims. (Cl. 260—94.9)

This invention is directed to the preparation of normally solid polyethylene at moderate temperatures and pressures using as the catalyst the material resulting from ball milling titanium trichloride in an atmosphere of propylene.

It is well known that, of the three titanium chlorides, only $TiCl_2$ is per se a polyolefin catalyst. $TiCl_3$ and $TiCl_4$ require cocatalysts, e.g., aluminum alkyls, to activate them. So far as is known, it has never before been proposed to activate $TiCl_3$ by prolonged grinding in propylene.

EXAMPLE 1

Catalyst Activation 200 gms. of $TiCl_3$ (minus 100 mesh) were charged to a 590 ml. stainless steel ball mill containing seventy-five ⅜″ stainless steel balls and removably connected through two needle valves to a rotatable gas cylinder (75 ml. capacity).

The entire rotatable mechanism was charged initially with 110 p.s.i.g. of propylene, the valves were closed and milling was commenced. After three days of milling at room temperature, a further charge of 110 p.s.i.g. propylene was released into the rotatable mechanism and milling was continued in the same way for two more days. Following the five days' milling, the $TiCl_3$ catalyst showed a gain of 16 gms. of propylene (8% of the total $TiCl_3$ catalyst weight). The thus-activated catalyst was transferred to a storage vessel under argon to be used for subsequent ethylene polymerization.

EXAMPLE 2

Polyethylene Synthesis

Into a 1-liter vertical stirred autoclave under an inert atmosphere of nitrogen was introduced 1.9 grams of the activated $TiCl_3$ catalyst as prepared in Example 1 and 300 grams of pure cyclohexane. The autoclave was heated with stirring to 150° C. and when it reached this temperature it was pressured to 440 p.s.i.g. with ethylene. The autoclave was maintained under these conditions for 1 hour. At the end of this time the autoclave was vented, cooled and the product recovered. The crude polymer was washed in a Waring Blendor with a solution of isopropanol-HCl (10% by volume) acetyl-acetone (1% by weight) for 10 minutes. Thereafter the polymer was filtered free of the washed solution and rewashed with isopropanol. The polymer was then vacuum-dried to constant weight.

The conditions herein recited are by no means critical. In general, in the preparation of the catalyst, substantially any amount of exposure of the milling $TiCl_3$ to propylene at room temperature will be effective to activate the catalyst. However, for good results it is preferred to carry out the milling until the $TiCl_3$ picks up at least 0.5% propylene by weight. When using a ball mill this generally requires milling at least one day under a propylene pressure of at least 2 atmospheres (gage). Preferably, the propylene pressure should be maintained at 5–15 atmospheres throughout the milling. Ball milling for five days will ensure an active catalyst under substantially any conditions, bearing in mind that occasionally the $TiCl_3$ used may contain traces of adsorbed water which delays the propylene activation somewhat. The catalyst may be milled for periods in excess of 5 days if desired, whereby the propylene pick-up may reach 10–15%, but there is little or no advantage in such prolonged activations. It is essential at all times to exclude water or oxygen from the catalyst during and after the activation. It is possible, for example, to add the propylene to the ball mill in admixture with an inert gas such as nitrogen, argon, helium, or the like, provided that the total gas charged contains no more than traces of moisture or oxygen.

In conducting the polymerization a wide variation in conditions is possible. For example, it is possible to use a catalyst:ethylene weight ratio of 0.001–1:1. The polymerization temperature, while preferably about 150° C. can be as low as 75° C. and as high as 200° C. The pressure can be within the range of 100 p.s.i. to 1000 p.s.i. and even higher. As a matter of fact, the upper limit on the pressure is generally determined by the equipment. Using extremely strongwalled autoclaves, the process can be carried out at temperatures of the order of 10,000 p.s.i. For practical purposes, however, a pressure of about 500 p.s.i. is suitable. The reaction time is not critical, some product being formed within a few seconds on reaching polymerization conditions of temperature and pressure. It is preferred, however, to continue the reaction for at least 1 hour so as to make adequate use of the catalyst. The inert solvent is likewise not critical. In point of fact, it is possible to make some polyethylene without using any solvent. However, preferably a solvent is used and preferably an inert organic solvent common in the operation of the so-called Ziegler or Phillips polyethylene process. Such solvents include cyclohexane, hexane, heptane, benzene, toluene, xylene, tetrahydronaphthalene, high molecular weight liquid paraffins, chlorobenzene, chloronaphthalene, orthodichlorbenzene, ethylbenzene, isopropylbenzene, diethylbenzene, methylcyclohexane, and the like.

The recovery and purification technique may be varied widely. Substantially any of the well-known techniques for purification of the so-called "Ziegler" polyethylenes may be used.

The mechanism in the process is not clearly understood. It is a curious paradox of the process that the catalyst is substantially inoperative to polymerize propylene. For example, in one run closely similar to the conditions described in Example 2, the yield of solid polypropylene was only a slight trace.

The catalyst of this invention may be given further treatment to render it still more active, as for example, by the addition of aluminum alkyls, as disclosed and claimed in copending application Serial No. 823,361, filed June 29, 1959, Hoeg and Benning, now abandoned.

We claim:

1. The method of preparing a normally solid polyethylene comprising polymerizing ethylene at a temperature in the range 75 to 200° C. and at a pressure of at least 100 p.s.i. in an inert organic solvent with a catalyst consisting essentially of $TiCl_3$ ground under propylene until the $TiCl_3$ picks up at least 0.5% by weight of propylene.

2. The method according to claim 1 in which the polymerization is carried out at a temperature of 150° C. and at a pressure of about 440 p.s.i.g.

3. A method according to claim 2 in which the solvent is cyclohexane and the reaction time is 1 hour.

4. The method according to claim 3 in which the weight raio of activated TiCl$_3$:ethylene is substantially 0.001–1.0:1.

5. The method of preparing a polyethylene catalyst consisting of grinding TiCl$_3$ as the sole catalyst ingredient under propylene until the TiCl$_3$ picks up at least 0.5% by weight of propylene.

6. The method according to claim 5 in which the TiCl$_3$ is ball-milled for about five days under a propylene pressure of about 110 p.s.i.

References Cited in the file of this patent

UNITED STATES PATENTS 2,933,485    D'Alelio _____ Apr. 19, 1960